United States Patent
Yasumori et al.

(10) Patent No.: US 12,184,136 B2
(45) Date of Patent: Dec. 31, 2024

(54) ROTATING ELECTRIC MACHINE

(71) Applicant: Mitsubishi Electric Corporation, Tokyo (JP)

(72) Inventors: Takayuki Yasumori, Tokyo (JP); Takahiro Mizuta, Tokyo (JP); Kosho Yamane, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 237 days.

(21) Appl. No.: 18/008,447

(22) PCT Filed: Jul. 31, 2020

(86) PCT No.: PCT/JP2020/029409
§ 371 (c)(1),
(2) Date: Dec. 6, 2022

(87) PCT Pub. No.: WO2022/024337
PCT Pub. Date: Feb. 3, 2022

(65) Prior Publication Data
US 2023/0198360 A1    Jun. 22, 2023

(51) Int. Cl.
*H02K 16/00* (2006.01)
*H02K 1/17* (2006.01)
*H02K 1/24* (2006.01)

(52) U.S. Cl.
CPC .............. *H02K 16/00* (2013.01); *H02K 1/17* (2013.01); *H02K 1/24* (2013.01); *H02K 2213/03* (2013.01)

(58) Field of Classification Search
CPC .................. H02K 16/00; H02K 1/17
(Continued)

(56) References Cited

U.S. PATENT DOCUMENTS 4,358,693 A * 11/1982 Palmer .................. H02K 25/00
310/46
4,626,719 A * 12/1986 Foster .................... H02K 37/04
310/49.43
(Continued)

FOREIGN PATENT DOCUMENTS

JP    2009-213256 A    9/2009
JP    2012-231586 A    11/2012
(Continued)

OTHER PUBLICATIONS

International Search Report and Written Opinion mailed on Oct. 13, 2020, received for PCT Application No. PCT/JP2020/029409, filed on Jul. 31, 2020, 8 pages including English Translation.
(Continued)

*Primary Examiner* — Alexander Talpalatski
(74) *Attorney, Agent, or Firm* — XSENSUS LLP (57) ABSTRACT

In a rotating electric machine, an axis direction width of a rotor core arranged at an end of a load side of the rotating shaft is set to be $\gamma$, an axis direction width of a rotor core arranged at an opposite side end of the load side is set to be $\varepsilon$, a distance from a support part at the load side to the rotor core at the load side is set to be $\alpha$, and a distance from a support part at the opposite side of the load side to a rotor core at the opposite side of the load side is set to be $\beta$. In a case of $\alpha > \beta$, $\gamma \geq \varepsilon$ is satisfied, and in a case of $\alpha < \beta$, $\gamma \leq \varepsilon$ is satisfied. Thereby, the vibration of the rotor can be suppressed effectively.

14 Claims, 11 Drawing Sheets

(58) Field of Classification Search
USPC .................. 310/46, 49.38, 49.39, 154.33
See application file for complete search history.

(56) References Cited

U.S. PATENT DOCUMENTS

| | | | | |
|---|---|---|---|---|
| 5,990,590 | A * | 11/1999 | Roesel, Jr. | ............ H02K 7/025 |
| | | | | 310/112 |
| 7,589,440 | B2 * | 9/2009 | Oiwa | ..................... H02K 37/18 |
| | | | | 310/49.39 |
| 9,871,417 | B2 * | 1/2018 | Saito | ................... H02K 1/2706 |
| 10,454,394 | B2 * | 10/2019 | Okamoto | .................. H02P 6/10 |
| 10,601,347 | B2 * | 3/2020 | Kobayashi | ............... H02P 6/10 |
| 2007/0284963 | A1 * | 12/2007 | Mukai | .................... H02K 1/243 |
| | | | | 310/263 |
| 2009/0021089 | A1 * | 1/2009 | Nashiki | ............... H02K 21/145 |
| | | | | 310/46 |
| 2009/0224627 | A1 | 9/2009 | Hino et al. | |
| 2010/0295389 | A1 * | 11/2010 | Tessier | ................ H02K 19/103 |
| | | | | 310/46 |
| 2011/0070108 | A1 | 3/2011 | Arita et al. | |
| 2012/0274160 | A1 | 11/2012 | Hino et al. | |
| 2015/0357892 | A1 | 12/2015 | Nakano et al. | |

FOREIGN PATENT DOCUMENTS

| | | |
|---|---|---|
| JP | 2017-189003 A | 10/2017 |
| JP | 2019-193350 A | 10/2019 |
| WO | 2009/136574 A1 | 11/2009 |
| WO | 2014/174572 A1 | 10/2014 |
| WO | 2018/083898 A1 | 5/2018 |

OTHER PUBLICATIONS

Office Action issued Jan. 9, 2024 in Japanese Patent Application No. 2022-539934, 11 pages.

* cited by examiner

ROTATING ELECTRIC MACHINE

CROSS-REFERENCE TO RELATED APPLICATION

The present application is based on PCT filing PCT/JP2020/029409, filed Jul. 31, 2020, the entire contents of which are incorporated herein by reference.

FIELD OF THE INVENTION

The present application relates to the field of a rotating electric machine.

BACKGROUND OF THE INVENTION

In industrial use and in-vehicle use motors, higher output and higher speed of those motors are required. As a motor which meets these demands, known is the rotating electric machine (henceforth, referred to as a stator magneto motor) which is equipped with a robust rotor having protrusion shapes, constructed with iron cores only, and permanent magnets and armature windings in a stator. For example, an existing stator magneto motor is shown in the Patent Document 1. In this rotating electric machine, a stator core is equipped with permanent magnets which are magnetized in a radial direction, and the core is divided in an axis direction. Additionally, the position of the salient pole is deviated by a half salient pole pitch between a divided rotor core and its adjacent rotor core.

CITATION LIST

Patent Literature

Patent Document 1: WO 2009/136574

SUMMARY OF THE INVENTION

Technical Problem

In such a stator magneto motor, there arises a problem that a rotor suffers from the increase in the vibration which is attributed to electromagnetic excitation forces. Even if only the rotor core is divided in the axis direction, vibration of the rotor core cannot be suppressed effectively. In order to suppress the vibration of a rotor effectively, it is necessary to determine in an appropriate manner, for example, the axis direction division number of a rotor core, and the division ratio of a rotor core, or the division number of a rotor core and the division ratio of a rotor core which are in consideration of a distance between bearings.

The present application is made in order to solve the above-mentioned subjects, and to determine the division number of the divided rotor cores and the division ratio of a rotor core, and aims at obtaining a rotating electric machine which is capable of suppressing effectively the vibration of a rotor, which is attributed to electromagnetic excitation forces.

Solution to Problem

The rotating electric machine according to the present application is a rotating electric machine having a stator and a rotor, the rotor provided on a rotating shaft, whose both sides am supported rotatably by support parts, and divided into a plurality of rotor cores,
wherein, among the plurality of rotor cores, an axis direction width of a rotor core arranged at an end of a load side of the rotating shaft is set to be $\gamma$,
an axis direction width of a rotor core arranged at an opposite side end of the load side of the rotating shaft is set to be $\varepsilon$,
a distance from a support part at the load side to the rotor core at the load side is set to be $\alpha$, and
a distance from a support part at the opposite side of the load side to a rotor core at the opposite side of the load side is set to be $\beta$,
further wherein, in a case of $\alpha > \beta$, $\gamma \geq \varepsilon$ is satisfied, and in a case of $\alpha < \beta$, $\gamma \leq \varepsilon$ is satisfied.

Advantageous Effects of Invention

According to the present application, the division size of a rotor core is conditioned by the distance from a support part to the rotor core. Thereby, the vibration of a rotor which is attributed to electromagnetic excitation forces can be effectively suppressed.

DESCRIPTION OF EMBODIMENTS

Embodiment 1

Figure 1:
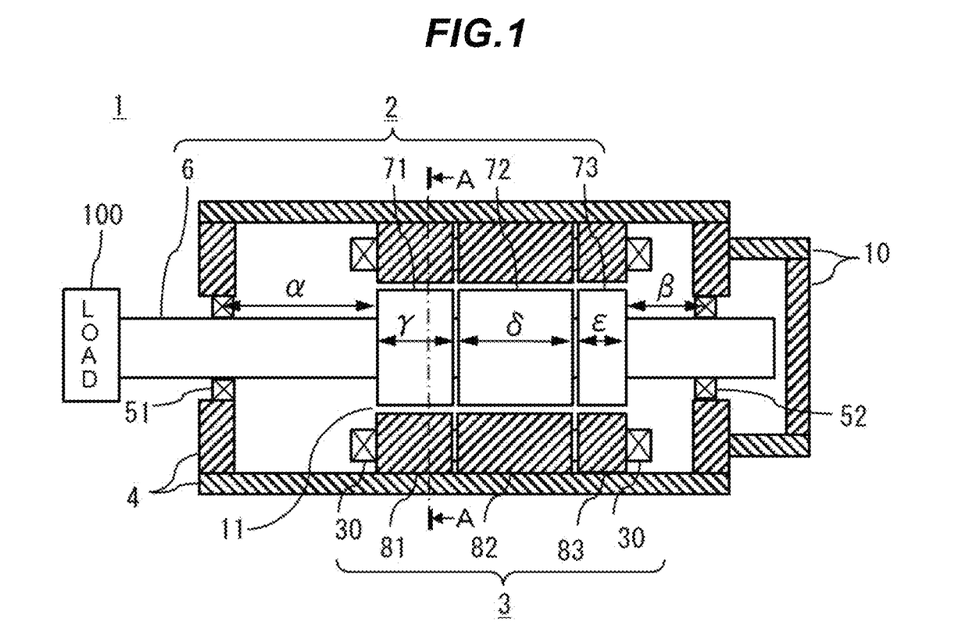
FIG. 1 is a sectional view which shows the rotating electric machine according to the Embodiment 1.

Hereinafter, explanation will be made about the rotating electric machine according to the Embodiment 1. FIG. 1 is a sectional view which shows the rotating electric machine according to the Embodiment 1 of the present application. In FIG. 1, the rotating electric machine 1 is equipped with a rotor 2, and a stator 3 which is of cylindrical shape and surrounds the rotor 2, and a pair of support parts 5 which are provided in a fame 4 and support the rotor 2. The rotor 2 has a rotating shaft 6 and rotor cores 7, and the rotor cores 7 are fixed with the rotating shaft 6, by thermal insert, or press fit and the like. Magnetic steel sheets are laminated along the axis direction of the rotating shaft 6, to constitute a rotor core 7. Moreover, a salient part protrudes toward the stator side to constitute a salient pole, and the rotor core is equipped with a plurality of salient poles. The rotating shaft 6 is supported by bearings 51 and 52, which are the support parts 5 at both ends. One of the both ends of the rotating shaft 6 stands out from the frame 4, in order to combine with an object which becomes a load 100. Henceforth, the direction in which the rotating shaft 6 stands out is referred to as the load 100 side. Moreover, the other end of the rotating shaft 6 is referred to as the opposite side of the load 100 side. In some cases, an encoder and others are attached to the rotating shaft 6 of the load 100 side. Moreover, a cover 10 for protecting the rotating shaft 6 may be attached in some cases.

The stator 3 is provided so as to cover the periphery of the rotor core 7, and has stator cores 8 which are provided to face to the rotor core 7, and stator coils 30 which are wound up in the axis direction of the stator core 8. An air gap 11 is a space between the outer periphery face of the rotor core 7 and the inner periphery face of the stator core 8. Moreover, at the load 100 side and at the opposite side of the load 100 side, the distance from the rotor core 7 to the support part 5 of the rotating shaft 6 is different. In FIG. 1, the distance between the rotor core 7 at the load 100 side and the bearing 51 which is a support part 5 is longer than the distance between the rotor core 7 at the opposite side of the load 100 side and the bearing 52 which is a support part 5.

The rotor core 7 and the stator core 8 are both divided into three parts along the axis direction. The divided rotor cores 7 are referred to as rotor cores 71, 72, and 73, from the load 100 side. Moreover, the opposing and divided stator cores 8 are referred to as stator cores 81, 82, and 83, from the load 100 side. Furthermore, the core width of the rotor core 71 is set to be $\gamma$; the core width of the rotor core 72 is set to be $\delta$, the core width of the rotor core 73 is set to be $\varepsilon$; the distance from the end part of the rotor core 71 at the load 100 side to the central part of the bearing 51 which is the support part 5 at the load 100 side is set to be $\alpha$; and the distance from the end part of the rotor core 73 at the opposite side of the load 100 side to the central part of the bearing 52 which is the support part 5 of the opposite side of the load 100 side is set to be $\beta$.

Figure 2:
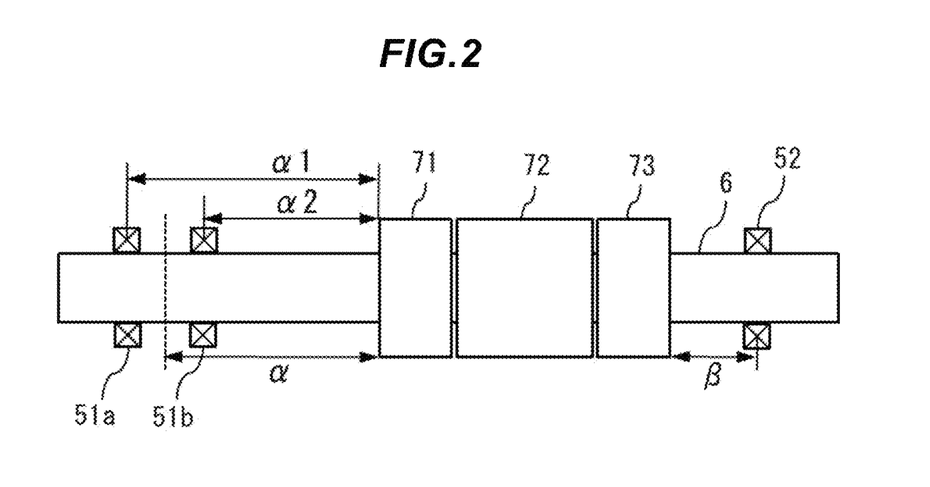
FIG. 2 is a schematic diagram which shows the rotor of the rotating electric machine according to the Embodiment 1.

Here, explanation will be made about the definition of the distance from a rotor core end part to the central part of a bearing, in the case where the support part has two or more bearings. FIG. 2 is a schematic diagram showing a rotor and bearings, in the case where the rotating electric machine has a bearing 51a and a bearing 51b at the load 100 side, where those two bearings are both the support parts 5. When attention is paid to the bearings 51a and 51b at the load 100 side, the distance from the end part of the rotor core 71 to the central part of the bearing 51a is set to be $\alpha1$, and the distance from the end part of the rotor core 71 to the central part of the bearing 51b is set to be $\alpha2$. In this case, the distance a from the end part of the rotor core 71 to the bearings is given by be the average value of $\alpha1$ and $\alpha2$. In FIG. 2, explanation is given to the case where the rotating electric machine has two bearings in the load 100 side.

However, if the number of bearings increases to three or more for one side, the distance from the end part of the rotor core 7 to the support part 5 can be similarly defined as the average of distances from the end part of the rotor core 7, regarding respective bearings.

In the above rotating electric machine which is shown in the Embodiment 1, required conditions are that at the time of $\alpha>\beta$, a formula $\gamma \geq \varepsilon$ is satisfied, or at the time of $\alpha<\beta$, a formulary $\gamma \leq \varepsilon$ is satisfied. By satisfying these conditions, the vibration of the rotor 2 which is attributed to the bending mode of third order can be suppressed effectively.

Here, bending mode expresses the form of vibrations. That is, the bending mode expresses how the rotor transforms (vibrates). Bending modes are generally represented by mode of first order, mode of second order, and mode of third order, in ascending order of the natural oscillation frequency. For example, the bending mode of first order is a form in which the entire rotor 2 is transformed in a bow shape, with the axis direction central part as an antinode, while the rotor core 7 is in eccentric behaviors. Moreover, the bending mode of second order is a form in which the rotor 2 is transformed in a wavy shape, while the entire rotor 2 rotates in a direction perpendicular to the axial direction. The bending mode of third order is a form in which phases of an antinode of the axial direction central part and the support portion 5 are in opposite phases, while the rotor 2 is transformed in a wavy shape, with the axis direction central part as an antinode. The wavelength of wave deformation becomes shorter, as the order of mode becomes higher.

Moreover, the natural oscillation frequency is the number of times an object vibrates freely in a second, and is also called a natural frequency. When the frequency of an external force, such as an electromagnetic excitation force, and the natural oscillation frequency match, the rotor 2 resonates, and the vibration will increase. That is, in order to effectively suppress the vibration of the rotor 2, it is important to grasp a bending mode which becomes the cause of the increase in the vibration, and suppress the mode.

Electromagnetic excitation forces by the rotor 2 and the stator 3 are configured so as to act on the rotor cores, reversing their power for every divided rotor core 7. Then, when the division number of the rotor core 7 is three, the vibration in the bending mode of first order can be prevented, while maintaining the balance of electromagnetic excitation forces between the rotor cores 71 and 73 at the axis direction both ends and the rotor core 72 at the center. Moreover, if the electromagnetic excitation forces by the rotor 2 and the stator 3 are of almost the same size in the axis direction, it is required that the ratio of $\gamma+\varepsilon:\delta$ becomes approximately 1:1. On the other hand, when an arrangement is employed in which an electromagnetic excitation force of the rotor core 72 is applied to the axis direction central part, and electromagnetic excitation forces of the opposite direction are applied to the rotor cores 71 and 73 which am at the both sides and near the support part 5, this arrangement will help to bring a form which promotes the vibration in the bending mode of third order where the wavelength is short. Therefore, there arises a concern that if the number of rotations becomes high, vibrations which are attributed to the bending mode of third order become strong.

In the case of $\alpha>\beta$, antinodes of the bending mode of first order and the bending mode of third order, which am produced in the axis direction central parts, are located in the position near the left side core end of the rotor core 71, rather than the right side core end of the rotor core 73 in FIG. 1. Then, the axial length of the rotor core 71 which is close to the axis direction central part is made longer, where the axis direction central part becomes an antinode of the bending mode, and the axial length of the rotor core 73 which is close to the support part 5 is made shorter. By doing so, without changing the ratio of γ+ε:δ, electromagnetic excitation forces of the rotor cores 71 and 73 can suppress vibrations in the bending mode of third order. That is, when the relation γ≥ε is satisfied, the axis direction central part and the neighborhood of the support part 5 will be held down by the electromagnetic excitation forces of the rotor cores 71 and 73. Therefore, the vibration which is attributed to the bending mode of third order can be reduced effectively. Moreover, the me reason also holds true, when the relation γ≤ε is employed at the time of α<β.

It is worth noticing that, although the division number of the rotor core 7 employs three in FIG. 1, this case does not limit the division number in particular. For example, in the case of a division in two, when the same conditions are applied to, vibrations in the bending mode of second order and the bending mode of fourth order can be reduced. Then, the vibration of the rotor 2 can be suppressed effectively.

Embodiment 2

In the Embodiment 2, explanation will be made about the division ratio of the rotor core 7, regarding the rotating electric machine 1 which is shown in FIG. 1. The rotor core 7 and the stator core 8 are both divided in three in the axis direction. As for the axis direction size of the core of the rotor core 7, the core width of the rotor core 71 is set to be γ, the core width of the rotor core 72 is set to be S, and the core width of the rotor core 73 is set to be ε, as described in the Embodiment 1. With respect to these sizes, required condition is that the ratio of γ+ε:δ falls in the range of 2:1.6 to 2:1.9. By satisfying this condition, the electromagnetic excitation forces which are generated in the rotor core 71 and the rotor core 73 can cancel out with the electromagnetic excitation force which is generated in the rotor core 72. That is, the vibration in the bending mode of first order can be reduced.

Figure 3:
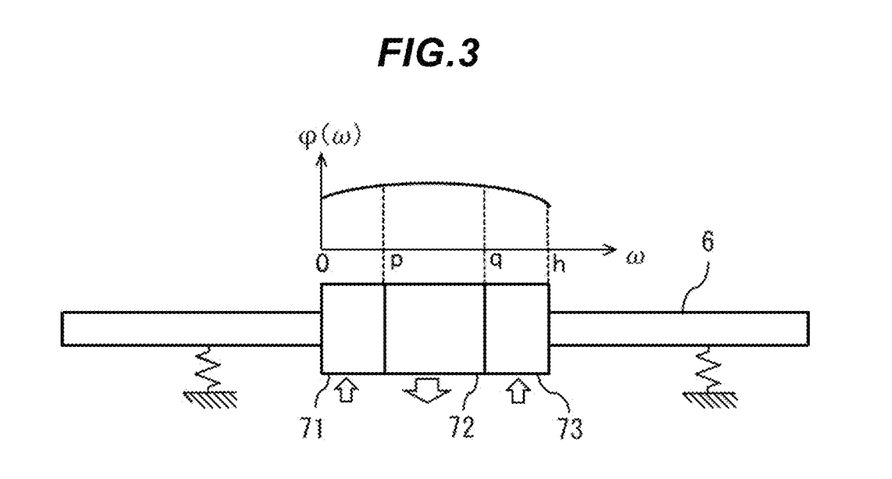
FIG. 3 is a schematic diagram which shows the rotor of the rotating electric machine according to the Embodiment 2.

The reason will be explained below. FIG. 3 shows a simplified model of the rotating electric machine 1 which is explained in the Embodiment 2. In order to reduce the vibration in the bending mode of first order due to the electromagnetic excitation force φ(ω), respective electromagnetic excitation forces of the divided rotor core 7 need to be cancelled out. Then, the division position p and the division position q may be determined so as to satisfy the Equation (1), where the full length of the rotor core 7 is set to be h.

[Equation 1]

$$\int_0^h \varphi(\omega)d\omega = 2\int_p^q \varphi(\omega)d\omega \qquad (1)$$

Figure 4:
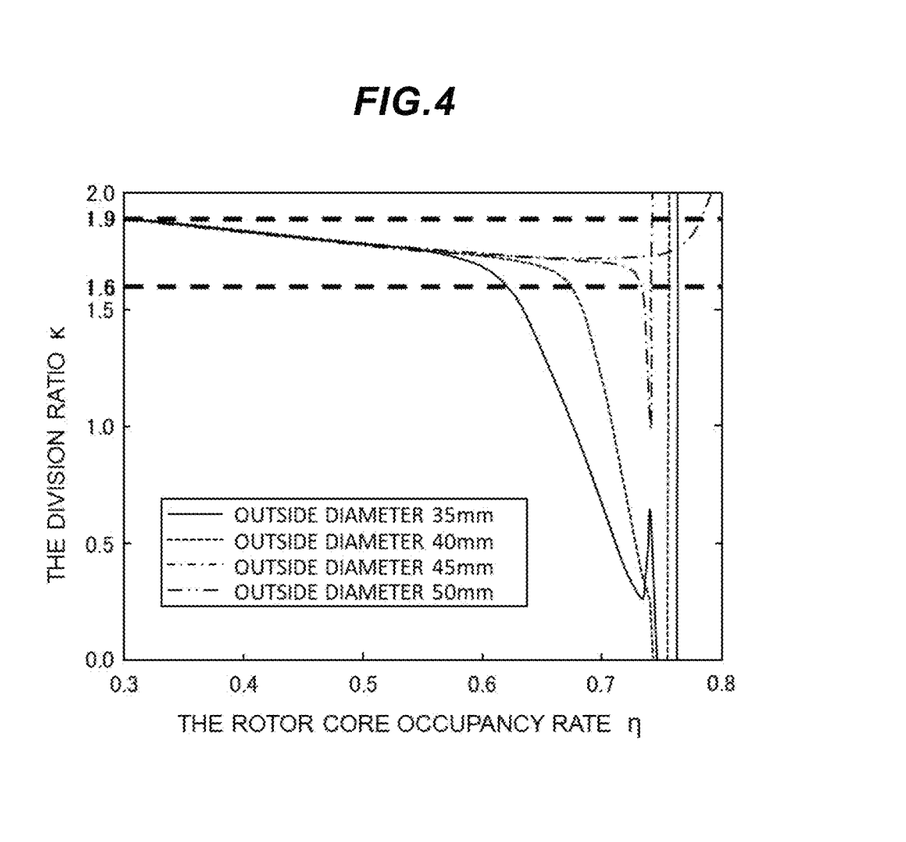
FIG. 4 is a drawing which shows the relation between the occupancy rate and the division ratio of the rotor core, regarding the rotating electric machine according to the Embodiment 2.

Next, explanation will be made about the reason why the ratio of γ+ε:δ is made in the range of 2:1.6 to 2:1.9. FIG. 4 is a drawing, where the vertical axis represents the division ratio κ (κ is a numerical value which fulfills the relation of γ+ε:δ=2:κ), and the horizontal axis represents the rotor core occupancy rate η (η is a numerical value which satisfies the relation (sum total of the core widths of the rotor core 7)/(the distance from the bearing 51 at the load 100 side to the bearing 52 at the opposite side of the load 100 side)). Moreover, the graph in the drawing plots values which satisfies the Equation (1), when the diameter of the rotating shaft 6 is changed, where electromagnetic excitation forces are cancelled out.

In FIG. 4, since the rotor, as a product, is a part which is attached to the surroundings of the rotor core 7 of the rotating shaft 6, it is realistic that the rotor core occupancy rate η is in the range of 0.3 to 0.7. From this graph, it is thought that the division ratio κ for cancelling electromagnetic excitation forces may be in the range of 1.6 to 1.9. Therefore, when the rotor core 7 is divided in three, the desired division fulfils the relation so that the ratio of γ+ε:δ may be in the range of 2:1.6 to 2:1.9. By this configuration, the vibration of the rotor 2 which is attributed to the bending mode of first order can be suppressed effectively. It is worth noticing that, although not mentioned so far, when the rotor core 7 is divided in three, them arises an effect that the vibration which is attributed to the bending mode of second order can be suppressed. That is, the transformation according to the bending mode of second order can be held down by electromagnetic excitation forces due to the rotor cores 71 and 73 at both ends, where, by setting the axis direction central part as a starting point, the bending mode of second order acts in opposite phases between a support part 5 at the load 100 side of the axis direction and a support part at the opposite side of the load 100 side.

As described above, according to the present Embodiment 2, vibrations of the rotor 2 which are attributed to the bending mode of first order and the bending mode of second order can be suppressed effectively.

Embodiment 3

Figure 5:
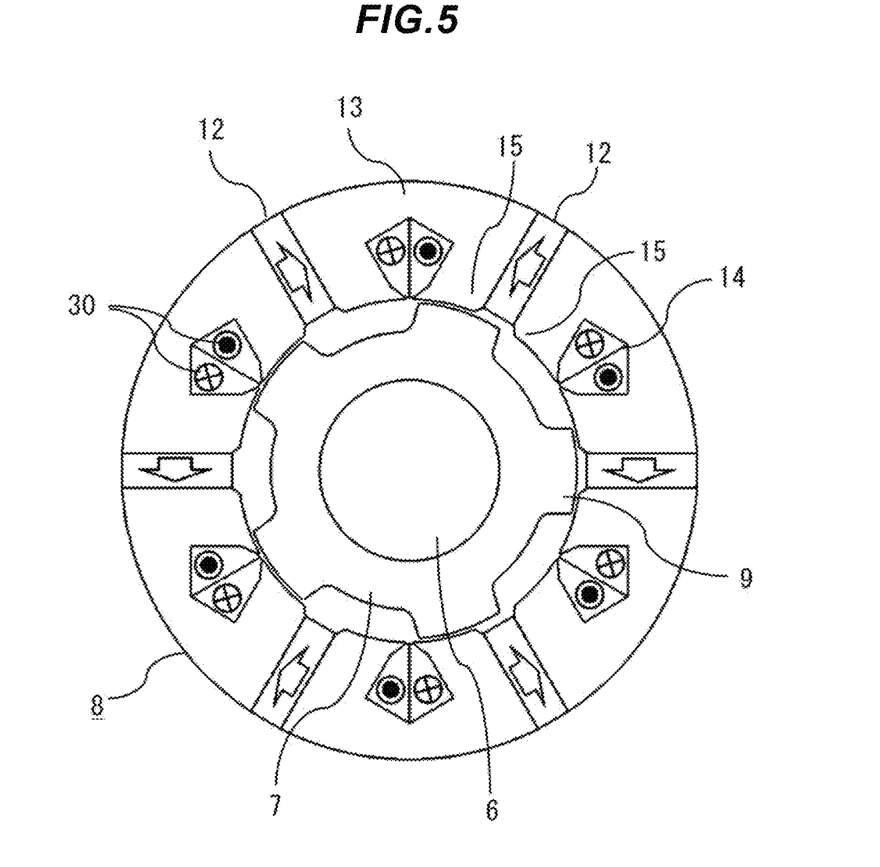
FIG. 5 is a sectional view which shows the rotating electric machine according to the Embodiment 3.

FIG. 5 is an arrow indicated sectional view which is taken along the line A-A of FIG. 1. In FIG. 5, the stator 3 has stator cores 8 or magnetic bodies, constituted by magnetic steel sheets, which are laminated along a lamination direction; and stator coils 30 which are provided in the stator core; and permanent magnets 12 which are provided in the stator core. Each of the stator cores 8 has core back parts 13 of cylindrical shape, slots 14 which have evenly spaced openings at the inner periphery side, and teeth parts 15. Each of the teeth parts 15 protrudes from the core back part 13 toward the side of the rotor core 7. Along the circumferential direction of the rotating electric machine 1, the teeth parts are arranged with an interval each other. Permanent magnets 12, which are separated in the axis direction, from the center of each teeth part 15 to the core back part 13 of the stator core 8, are arranged. Moreover, a pair of permanent magnets 12, which are arranged at mutually adjacent teeth parts 15, am arranged so that the directions of magnetic poles may face each other; for example, the paired permanent magnets are magnetized so that one N pole may face to the other N pole. On the drawing, the magnetic pole direction of a permanent magnet 12 is shown by an arrow of from the S pole to the N pole.

Winding wire is wound around, through the slot 14, so as to wrap in both of the teeth part 15 and the permanent magnet 12. Wire winding method is chosen from concentrated winding or distributed winding, in accordance with the combination of the number of main poles of the rotor, and the number of slots 14. In FIG. 5, the plurality of stator coils 30 are sorted out, into 3 phases of U phase, V phase, and W phase, and the stator coils 30 of the same phase are connected in series. Moreover, along the circumferential direction of the stator 3, the plurality of stator coils 30 are arranged in the order of U1, V1, W1, U2, V2, and W2. Moreover, the plurality of stator coils 30 are wound around the teeth parts 15 by the concentrated winding. In the drawing, the direction of the current which flows through the stator coil 30 of each slot 14 is shown by symbols.

The rotor core 7 is arranged around the rotating shaft 6, and has salient poles 9, which protrude to a stator side, at a regular angle pitch, along the circumferential direction of the rotor core 7. In FIG. 5, the number of the salient poles 9 of the rotor core 7 is 5, and the number of the slots and the pole number of the permanent magnets 12 are both 6. However, in the present application, this example does not limit the combination of respective numbers. Furthermore, although the permanent magnet 12 is arranged at the central part of each of the teeth parts 15, the effect of the present application can be demonstrated, even if arranged in any position of the stator 3.

Figure 6:
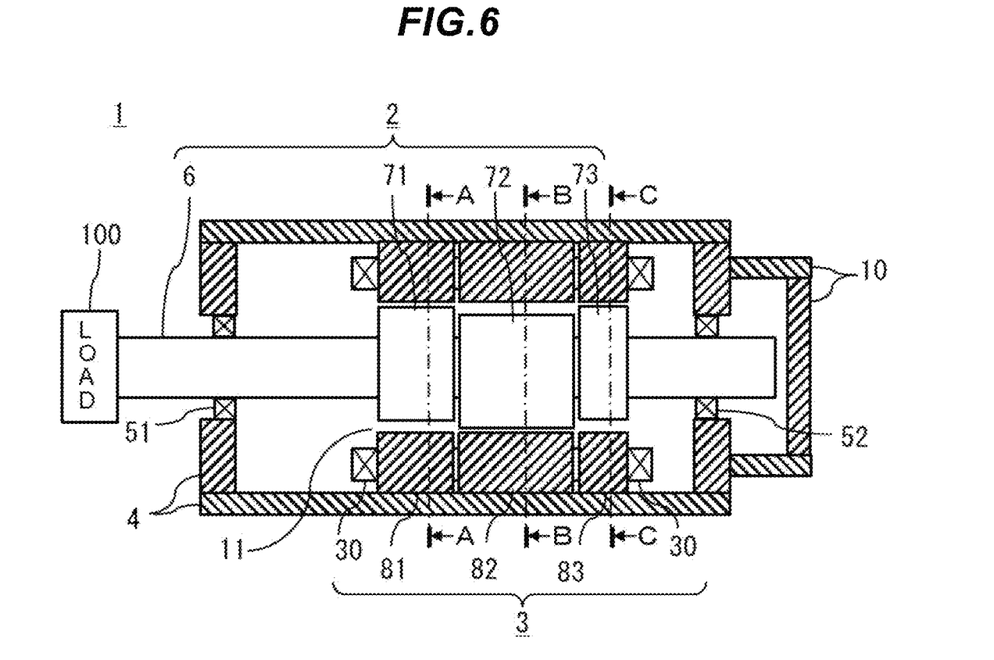
FIG. 6 is a first sectional view which shows the rotating electric machine according to the Embodiment 3.
Figure 7:
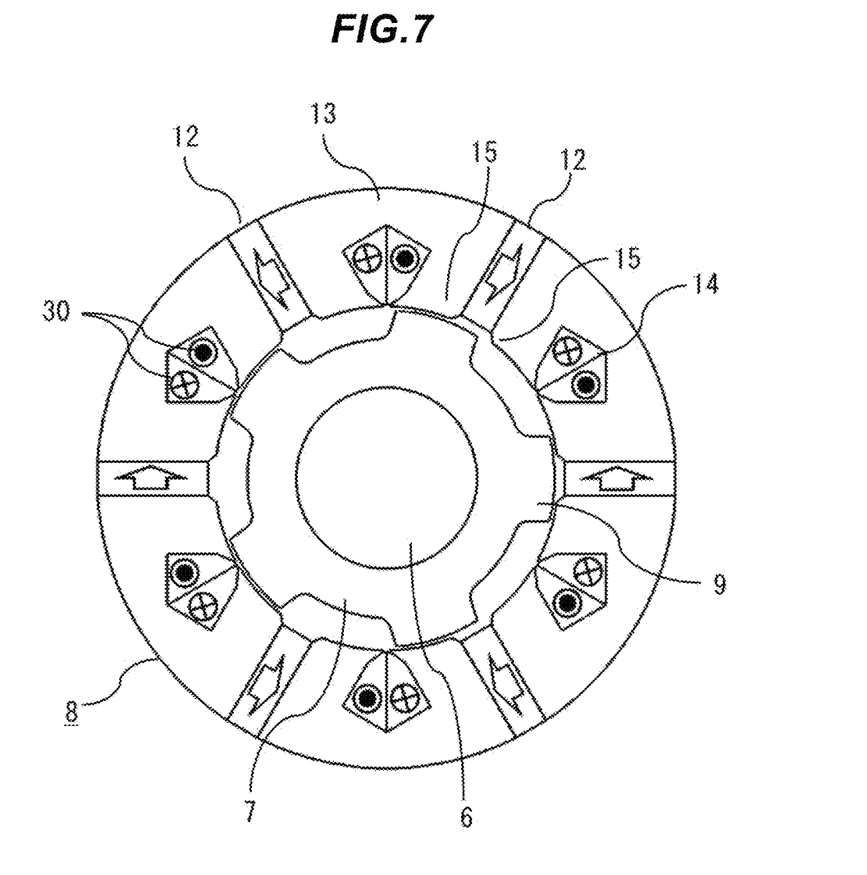
FIG. 7 is a second sectional view which shows the rotating electric machine according to the Embodiment 3.

FIG. 6 is a sectional view of the rotating electric machine 1 according to the Embodiment 3. In FIG. 6, the stator cores 8 and the rotor cores 7 are divided in the axis direction. When the divided stator cores 8 are referred to as a stator core 81, a stator core 82, and a stator core 83, from the load 100 side, the magnetization direction of the magnets inserted in the stator core 82 is reversed with respect to the magnetization direction of the permanent magnets 12 inserted in the stator core 81 and the stator core 83. Moreover, when the divided rotor cores 7 are referred to as a rotor core 71, a rotor core 72, and a rotor core 73, from the load 100 side, the rotor core 72 has a configuration in which the position of the salient pole 9 in the circumferential direction is deviated by ½ pitch with respect to the rotor core 71 and the rotor core 73. When the above configuration is represented by sections, which are perpendicular to the axis direction, an arrow indicated sectional view which is taken along the line A-A of FIG. 6 and an arrow indicated sectional view which is taken along the line C-C of FIG. 6 become FIG. 5, and a sectional view which is taken along the line B-B of FIG. 6 becomes FIG. 7.

According to this configuration, the direction of electromagnetic excitation forces which am produced in the rotor core 71 and the rotor core 73 becomes opposite with the direction of electromagnetic excitation force which is produced in the rotor core 72. That is, the electromagnetic excitation forces which are produced in the rotor core 71 and the rotor core 73 are cancelled out each other with the electromagnetic excitation force which is produced in the rotor core 72. Then, bending mode of first order can be suppressed, and the vibration of the rotor which is attributed to the bending mode of first order can be suppressed effectively.

Embodiment 4

Figure 8:
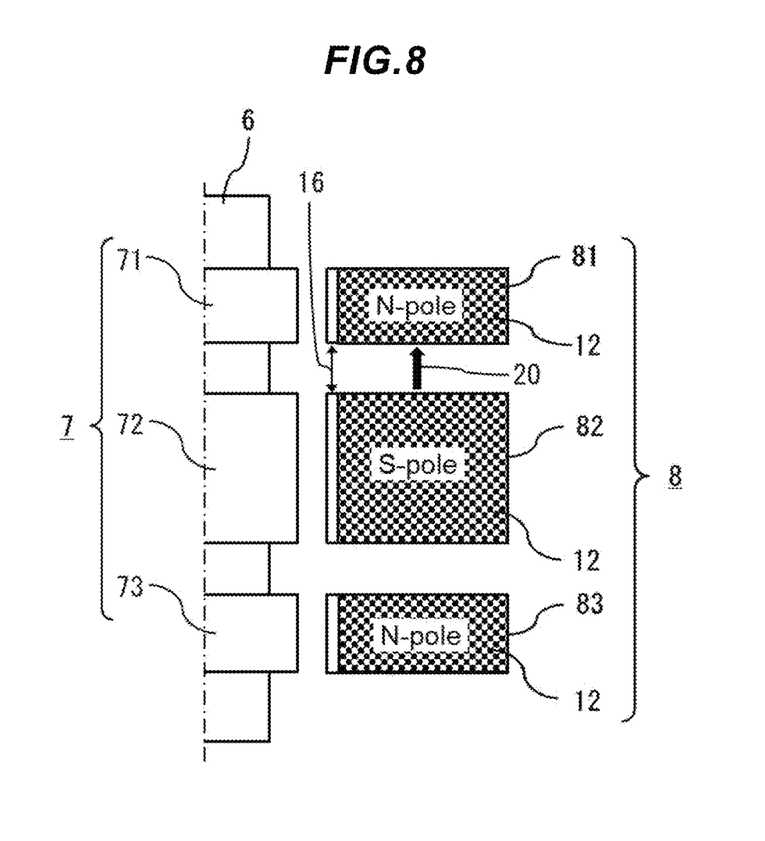
FIG. 8 is a partial sectional view which shows the rotating electric machine according to the Embodiment 4.

FIG. 8 is a partial sectional view of the rotating electric machine 1 according to the Embodiment 4, and permanent magnets 12 are shown in their sections. In FIG. 8, a configuration is employed in which, between cores of the stator core 8, axis direction gaps 16 are provided in the axis direction, where the axis direction gaps 16 are 4% or more, with respect to the axis direction full length of the stator core 8. Between a pair of divided stator cores 8 which are adjacent in the axis direction, magnetization directions of the permanent magnets 12 are different. That is, in a space along the axis direction, between adjacent stator cores 8, a short circuit 20 of magnetic flux will occur. Then, effective magnetic flux decreases, and thereby, the output per core volume will be reduced. For example, in a space, between adjacent stator cores 8 along the axis direction, such as the stator core 81 and the stator core 82, an axis direction gap 16 is provided. Thereby, the short circuit 20 of magnetic flux in the space along the axis direction between the stator cores 8 can be prevented. Then, the reduction of the output per core volume can be prevented.

Figure 9:
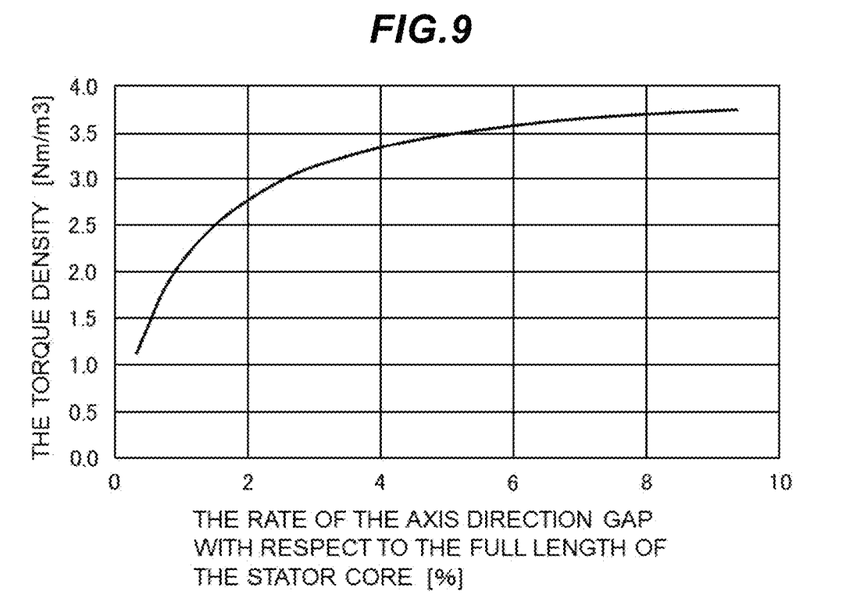
FIG. 9 is a drawing which shows the relation between the axis direction gap width and the torque density, regarding the rotating electric machine according to the Embodiment 4.
Figure 10:
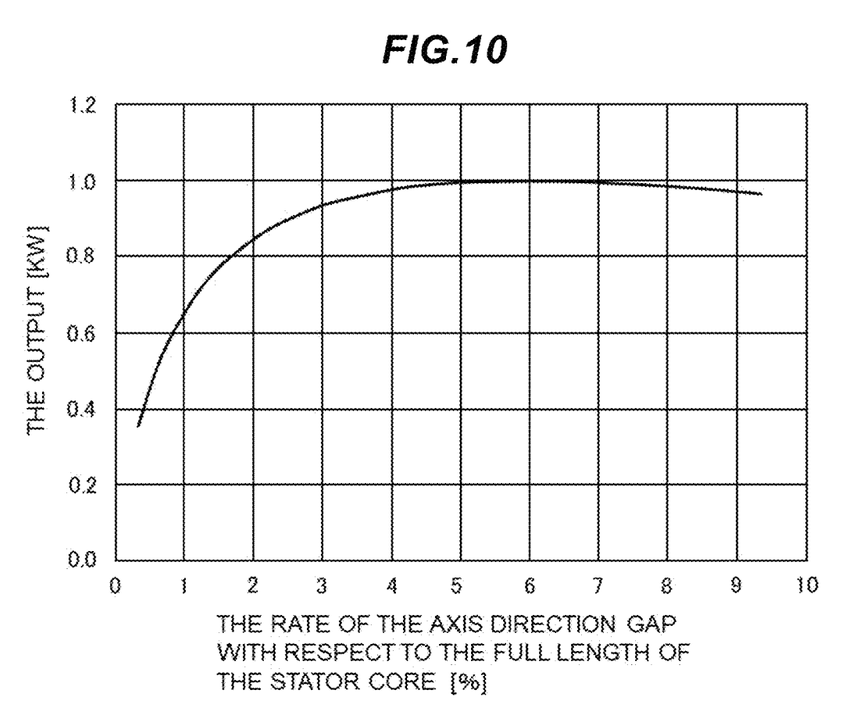
FIG. 10 is a drawing which shows the relation between the axis direction gap width and the output, regarding the rotating electric machine according to the Embodiment 4.

FIG. 9 shows the relation between the torque density in the output of the rotating electric machine 1, which is denoted in per volume of the stator core 8, and the rate of the axis direction gap 16 with respect to the full length of the stator core 8. In FIG. 9, it is shown that, as the rate of the axis direction gap 16 with respect to the full length of the stator core 8 becomes large, the per volume output of the stator core 8 increases. Moreover, FIG. 10 shows the relation between the output of the rotating electric machine 1 and the rate of the axis direction gap 16 with respect to the full length of the stator core 8. According to FIG. 10, it is understood that the rate of the axis direction gap 16 with respect to the full length of the stator core 8 is preferably in the range of 4% to 8.5%, where the output becomes the highest.

Moreover, the axis direction gap 16 may be filled up with a spacer, or may not be filled up with it. When the gap is filled up, it is desirable that the spacer is non-magnetic, such as resin. It is because eddy current loss will be generated, when a magnetic body is used. Then, the temperature of a spacer will rise, and the temperatures of the adjacent, rotor cores 7, the stator cores 8, and the permanent magnets 12 will rise. When resin cannot be used for a spacer from a viewpoint of strength, a non-magnetic metal may be used. It is worth noticing that, when the use of non-magnetic metal generates eddy current loss, thin plates may be laminated.

Embodiment 5

Figure 11:
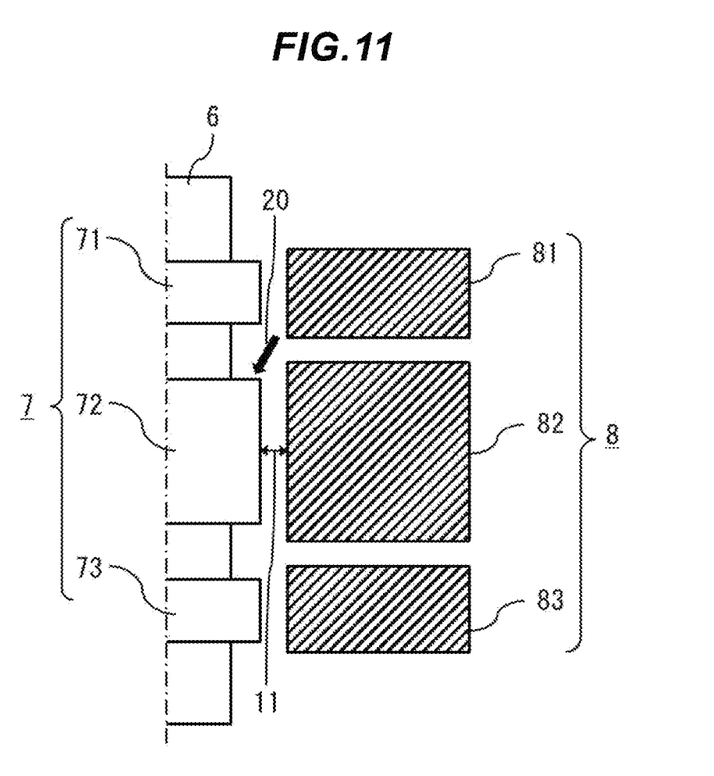
FIG. 11 is a partial sectional view which shows the rotating electric machine according to the Embodiment 5.

FIG. 11 is a partial sectional view of the rotating electric machine 1 according to the Embodiment 5. In FIG. 11, a configuration is employed in which the axis direction width of the rotor core 7 which faces to the stator core 8 divided in the axis direction is made smaller than the axis direction width of the stator core 8. For example, the permanent magnet 12 of the stator core 82 is reversed in the magnetization direction with respect to the permanent magnets 12 of the stator core 81 and the stator core 83. Therefore, a short circuit 20 of magnetic flux occurs, for example, among the rotor core 72, the stator core 81 which does not face to this core, and the air gap 11. Then, negative torque is generated, and thereby, an output may be reduced. When the rotating electric machine employs the configuration in which the length of the divided rotor core 7 is made shorter than the length of the opposing stator core 8, it becomes possible to prevent the occurrence of the short circuit 20 of magnetic flux, among a rotor core 7, the stator core 8 which does not face to the rotor core 7, and the air gap 11. Then, the reduction of an output can be suppressed. Moreover, since the mass of the rotor 2 can be reduced, it becomes possible to increase the limit of revolving speed.

Moreover, if the limit of revolving speed is made increased, the outside diameter of the rotating shaft 6 can be made small. Here, the reason will be explained why the outside diameter of the rotating shaft 6 can be made small, when the mass of the rotor 2 is reduced. The limit of revolving speed Nc can be calculated from the Equations (2).

[Equation 2]

$$\left.\begin{array}{l} Nc = \dfrac{30}{\pi}\sqrt{\dfrac{k}{M}} \\ k = \dfrac{3EIL}{L1^2 L2^2} \\ I = \dfrac{\pi a^4}{4} \end{array}\right\} \quad (2)$$

In the Equations (2), M represents the mass of the rotor 2, L represents the supporting distance of a bearing, L1 represents the distance from one end of the support to the gravity center of the rotor 2, L2 represents the distance from the opposite side end of the support to the gravity center E represents a longitudinal elastic modulus, I represents a section secondary moment, and a represents the radius of a rotating shaft.

Therefore, when the limit of revolving speed Nc to be designed is determined, the outside diameter of the rotating shaft 6 can be made smaller, by the amount corresponding to the reduced mass of the rotor 2. Moreover, when the outside diameter of the rotating shaft 6 is made small, the circumferential direction concave portion, which is the space between the salient poles 9 of the rotor core 7, can be deeply formed. Or, it becomes possible to take a large distance from the concave portion outside diameter of the rotor core 7 to the concave portion inside diameter, which is in contact with the rotating shaft 6. By adjusting these relations, magnetic flux which is occurred between the salient poles 9 of the rotor core 7 becomes easy to pass through. Additionally, since the magneto motive force from the stator 3 can be efficiently used for the torque generation of the rotor 7, the output of the rotating electric machine 1 can be increased.

As explained above, the configuration employed in the Embodiment 5 leads to the reduced size, higher revolving speed, and higher output of the rotating electric machine 1.

Embodiment 6

Figure 12:
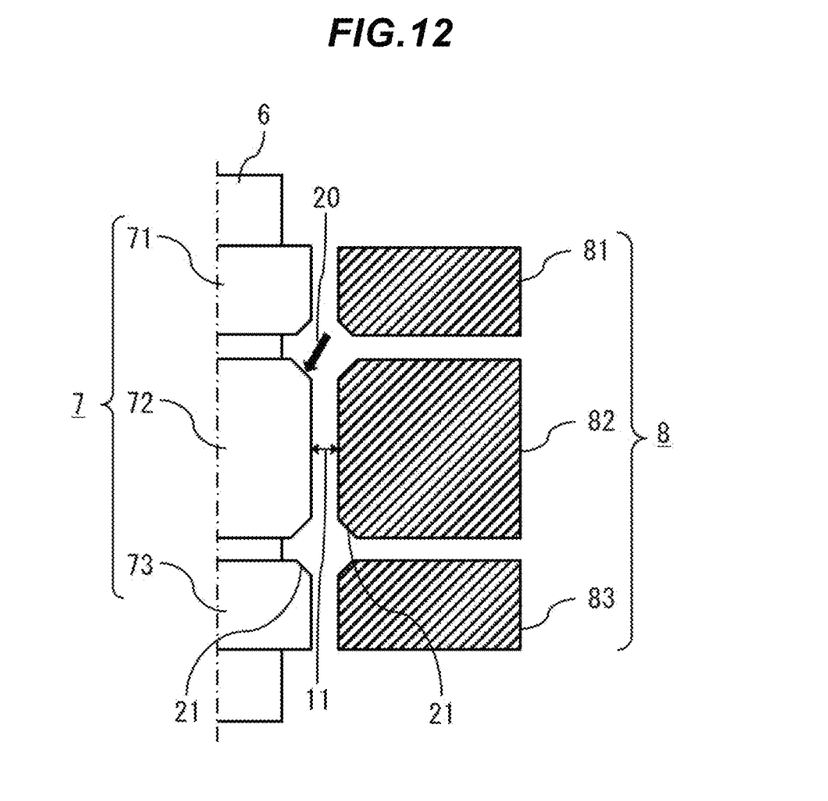
FIG. 12 is a partial sectional view which shows the rotating electric machine according to the Embodiment 6.

FIG. 12 is a partial sectional view of the rotating electric machine 1 according to the Embodiment 6. In FIG. 12, a configuration is employed in which the axis direction end part of each opposing surface has a chamfered corner 21, where the opposing surface is with regard to the stator core 8 which is divided in the axis direction, and salient poles of the rotor core 7 which faces to the stator core. By employing this configuration, the short circuit 20 of magnetic flux which occurs between a stator core 8 which does not face to the rotor core 7 and an air gap 11 can be prevented. Angle parts at both ends of the outer periphery of a rotor core 7, and angle parts at both ends of the inner periphery of a stator core 8 can become a route of the short circuit 20 of magnetic flux. By forming chamfered corners 21 at those angle parts, it becomes not necessary to make the whole core width of the rotor core 7 short. Then, the short circuit 20 of magnetic flux can be prevented, without reducing an output. It is worth noticing that, it is not necessary to chamfer all the both ends of the divided cores, and chamfering may be performed appropriately while confirming the characteristics. Moreover, the similar effect can be acquired, not only by chamfering but also by filleting.

Embodiment 7

Figure 13:
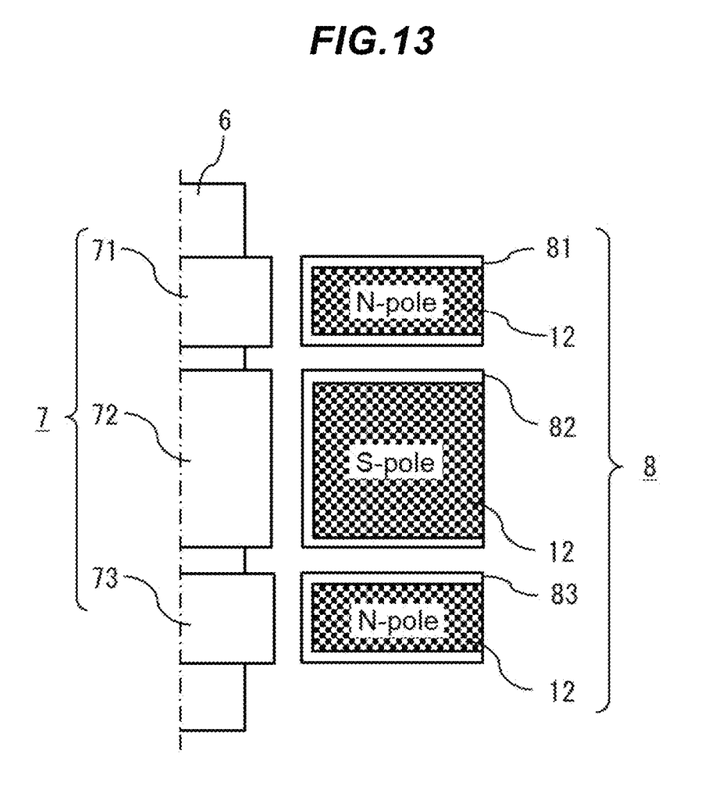
FIG. 13 is a partial sectional view which shows the rotating electric machine according to the Embodiment 7.

FIG. 13 is a partial sectional view of the rotating electric machine 1 according to the Embodiment 7, and permanent magnets 12 are shown in their sections. In FIG. 13, a configuration is employed in which the axis direction length of a permanent magnet 12 which is inserted in a divided stator core 8 is made shorter than the core width of the stator core 8. If the magnetic flux of the magnet leaks to the axis direction gap 16, both ends of a permanent magnet 12 will not contribute to effective magnetic flux. By employing this configuration, the length of the permanent magnet 12 which does not contribute to effective magnetic flux can be made short. Thereby, the volume of the magnet is reduced, and then, the cost can be decreased. It is worth noticing that, in FIG. 13, the magnet is made uniformly short from both ends with respect to the stator core 8. However, the magnet is allowed to be made short at only one end of the permanent magnet 12.

Embodiment 8

Figure 14:
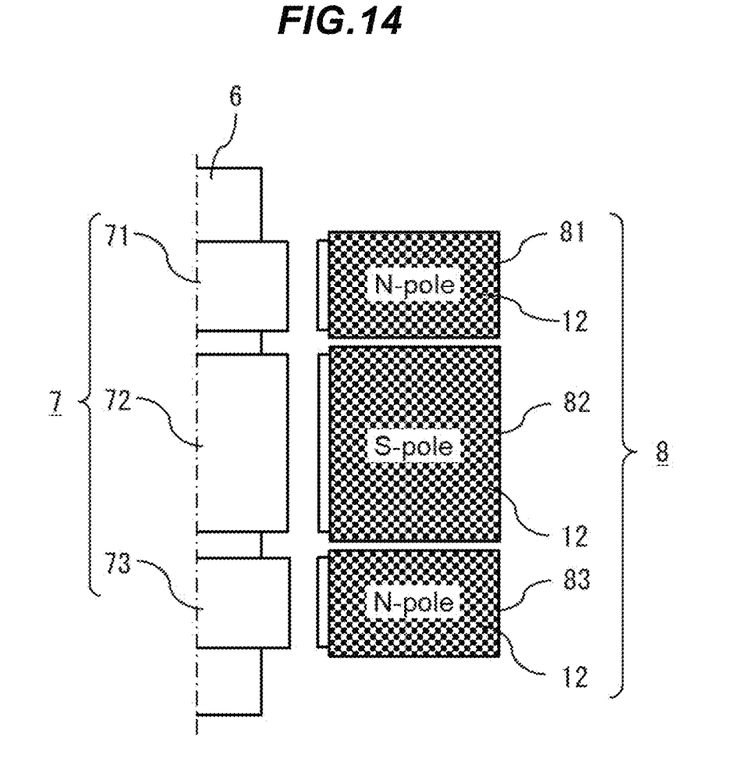
FIG. 14 is a partial sectional view which shows the rotating electric machine according to the Embodiment 8.

FIG. 14 is a partial sectional view of the rotating electric machine 1 according to the Embodiment 8, and permanent magnets 12 are shown in their sections. In FIG. 14, a configuration is employed in which the axis direction length of a permanent magnet 12 which is inserted in a divided stator core 8 is made longer than the core width of the stator core 8. If the magnetic flux of the permanent magnet 12 leaks in the axis direction, effective magnetic flux will decrease. By employing this configuration, the volume of the magnet can be increased. Thereby, effective magnetic flux increases and the output can be raised. It is worth noticing that, in FIG. 14, the permanent magnet 12 is made uniformly long from both ends with respect to the stator core 8. However, the permanent magnet is allowed to be made long only at one end of the magnet.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 Rotating Electric Machine: 2 Rotor: 3 Stator: 30 Stator Coil: 4 Frame: 5 Support Part: 51, 51*a*, 51*b*, 52 Bearing: 6 Rotating Shaft: 7, 71, 72, 73 Rotor Core: 8, 81, 82, 83 Stator Core: 9 Salient Pole: 10 Cover: 11 Air Gap: 12 Permanent Magnet: 13 Core Back Part: 14 Slot: 15 Teeth Part: 16 Axis Direction Gap: 20 Short Circuit of Magnetic Flux: 100 Load.

What is claimed is:

1. A rotating electric machine having a stator and a rotor, the rotor provided on a rotating shaft, whose both sides are supported rotatably by support parts, and divided into a plurality of rotor cores, wherein, among the plurality of rotor cores, an axis direction width of a rotor core arranged at an end of a load side of the rotating shaft is set to be $\gamma$, an axis direction width of a rotor core arranged at an opposite side end of the load side of the rotating shaft is set to be $\varepsilon$, a distance from a support part at the load side to the rotor core at the load side is set to be $\alpha$, and a distance from a support part at the opposite side of the load side to a rotor core at the opposite side of the load side is set to be $\beta$, further wherein, in a case of $\alpha>\beta$, $\gamma\geq\varepsilon$ is satisfied, and in a case of $\alpha<\beta$, $\gamma\leq\varepsilon$ is satisfied.

2. A rotating electric machine having a stator and a rotor, the rotor provided on a rotating shaft, whose both sides are supported rotatably by support parts, and divided into three rotor cores,
wherein, when axis direction widths of the three rotor cores are set to be $\gamma$, $\delta$, and $\varepsilon$, from a load side of the rotating shaft, a ratio of $\gamma+\varepsilon:\delta$ is in a range of 2:1.6 to 2:1.9.

3. The rotating electric machine according to claim 1,
wherein the stator is divided into a plurality of stator cores, in accordance with axis direction positions of the rotor cores,
the stator core has slots which have openings with a regular interval at an inner periphery side, and teeth parts which protrude with a regular interval at an inner periphery side,
furthermore, the stator core has permanent magnets which are separated in the axis direction, from a center of the teeth part which faces to the rotor, toward a core back part which becomes an outer periphery of the stator core, and are magnetized so that magnetic poles may face each other for every teeth part,
the permanent magnets are provided, reversing their magnetic poles for every stator core divided in the axis direction,
the rotor core has salient poles which are arranged at a regular angle pitch in a circumferential direction, and
the position of the salient pole is deviated by ½ pitch in the circumferential direction, for every rotor core divided in the axial direction.

4. The rotating electric machine according to claim 3,
wherein an axis direction gap is 4% or more of an axis direction full length of the stator core, where the axis direction gap is a space between adjacent cores among the stator cores which are divided in the axis direction.

5. The rotating electric machine according to claim 3,
wherein an axis direction width of the rotor core which faces to a stator core divided in the axis direction is smaller than the axis direction width of the stator core.

6. The rotating electric machine according to claim 3,
wherein axis direction end parts of respective opposing surfaces have a chamfered corner, where the respective opposing surfaces are with regard to the stator core divided in the axis direction and salient poles of the opposing rotor core.

7. The rotating electric machine according to claim 3,
wherein an axis direction length of the permanent magnet provided in a stator core is shorter than an axis direction width of the stator core.

8. The rotating electric machine according to claim 3,
wherein an axis direction length of the permanent magnet provided in a stator core is longer than an axis direction width of the stator core.

9. The rotating electric machine according to claim 2,
wherein the stator is divided into a plurality of stator cores, in accordance with axis direction positions of the rotor cores,
the stator core has slots which have openings with a regular interval at an inner periphery side, and teeth parts which protrude with a regular interval at an inner periphery side,
furthermore, the stator core has permanent magnets which are separated in the axis direction, from a center of the teeth part which faces to the rotor, toward a core back part which becomes an outer periphery of the stator core, and are magnetized so that magnetic poles may face each other for every teeth part,
the permanent magnets are provided, reversing their magnetic poles for every stator core divided in the axis direction,
the rotor core has salient poles which are arranged at a regular angle pitch in a circumferential direction, and
the position of the salient pole is deviated by ½ pitch in the circumferential direction, for every rotor core divided in the axial direction.

10. The rotating electric machine according to claim 9,
wherein an axis direction gap is 4% or more of an axis direction full length of the stator core, where the axis direction gap is a space between adjacent cores among the stator cores which are divided in the axis direction.

11. The rotating electric machine according to claim 9,
wherein an axis direction width of the rotor core which faces to a stator core divided in the axis direction is smaller than the axis direction width of the stator core.

12. The rotating electric machine according to claim 9,
wherein axis direction end parts of respective opposing surfaces have a chamfered corner, where the respective opposing surfaces are with regard to the stator core divided in the axis direction and salient poles of the opposing rotor core.

13. The rotating electric machine according to claim 9,
wherein an axis direction length of the permanent magnet provided in a stator core is shorter than an axis direction width of the stator core.

14. The rotating electric machine according to claim 9,
wherein an axis direction length of the permanent magnet provided in a stator core is longer than an axis direction width of the stator core.

* * * * *